United States Patent [19]
Fujita et al.

[11] Patent Number: 5,774,934
[45] Date of Patent: Jul. 7, 1998

[54] GROMMET AND A METHOD FOR MOUNTING A GROMMET

[75] Inventors: Hiroo Fujita; Yukimitsu Hattori, both of Yokkaichi; Yasuhiro Kasahara; Kenji Kotani, both of Aichi-ken, all of Japan

[73] Assignee: Sumitomo Wiring Systems, Ltd., Japan

[21] Appl. No.: 828,803

[22] Filed: Mar. 27, 1997

[51] Int. Cl.⁶ .................................................. F16L 5/00
[52] U.S. Cl. ................................... 16/2.1; 174/153 G
[58] Field of Search ............................ 16/2.1, 2.2, 2.5; 174/152 R, 152 A, 153 A, 153 G, 65 R, 65 G; 248/56

[56] References Cited

U.S. PATENT DOCUMENTS

| | | | |
|---|---|---|---|
| 2,800,526 | 7/1957 | Moorhead | 16/2.1 |
| 2,897,533 | 8/1959 | Bull et al. | 16/2.1 |
| 3,243,206 | 3/1966 | Samer | 16/2.1 |
| 5,453,579 | 9/1995 | Cohea | 174/153 G |
| 5,526,549 | 6/1996 | Mori et al. | 16/2.1 |
| 5,531,459 | 7/1996 | Fukuda et al. | 16/2.2 |

FOREIGN PATENT DOCUMENTS 2-66816  3/1990  Japan .

*Primary Examiner*—Chuck Mah
*Attorney, Agent, or Firm*—Anthony J. Casella; Gerald E. Hespos; Ludomir A. Budzyn

[57] ABSTRACT

To facilitate the mounting of a grommet in a hole formed in a body panel of a vehicle only by inserting it in one direction with a small force. There is provided a turnup portion 5d folded back from the outer radial end of a large diameter tubular portion 5c toward a small diameter tubular portion 5a. A locking groove 5e having a U-shaped cross is formed in the outer surface of the turnup portion 5d. At the leading end of the turnup portion 5d extending toward the small diameter tubular portion 5a, a locking portion 5g projects radially inwardly. A locking stepped portion 5h projects from the outer surface of the large diameter tubular portion 5c in a position corresponding to the locking groove 5e. When the locking portion 5g is engaged with the locking stepped portion 5h after pulling back the small diameter tubular portion 5a to locate the locking stepped portion 5h more backward than the locking portion 5g, the locking groove 5e comes to have an L-shaped cross section and be located at the front end of the grommet, thereby allowing the grommet to be inserted into a hole 6a in a body panel. When the locking portion 5g is disengaged from the locking stepped portion 5h after the insertion, the locking groove 5e is restored to have a U-shaped cross section so as to be fittable to the hole 6a in the body panel.

12 Claims, 3 Drawing Sheets

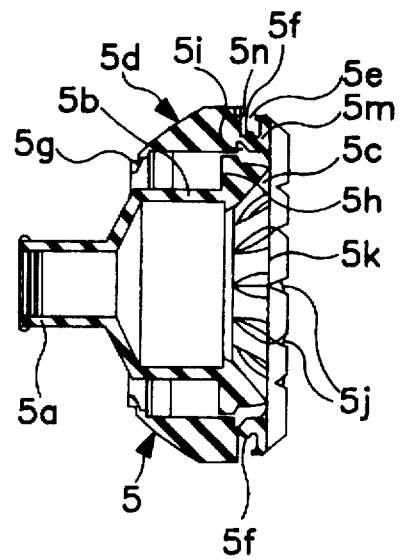 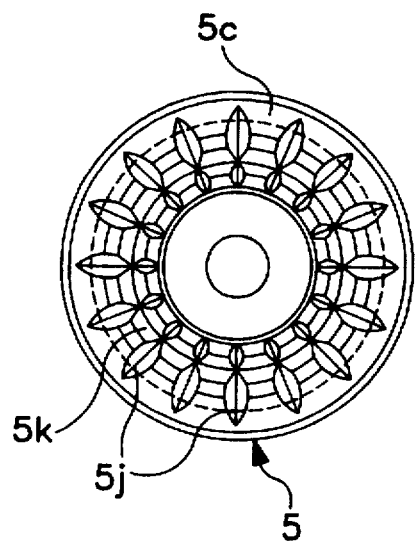
FIG. 1A  FIG. 1B
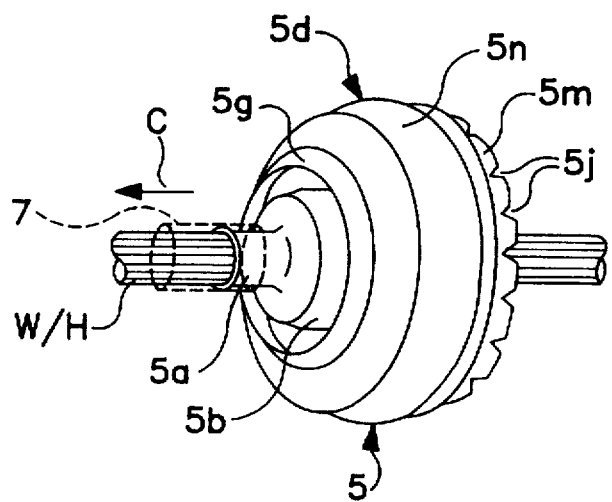
FIG. 2

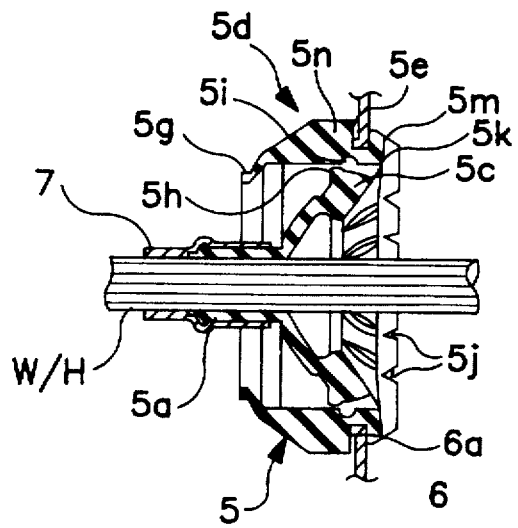
FIG. 5
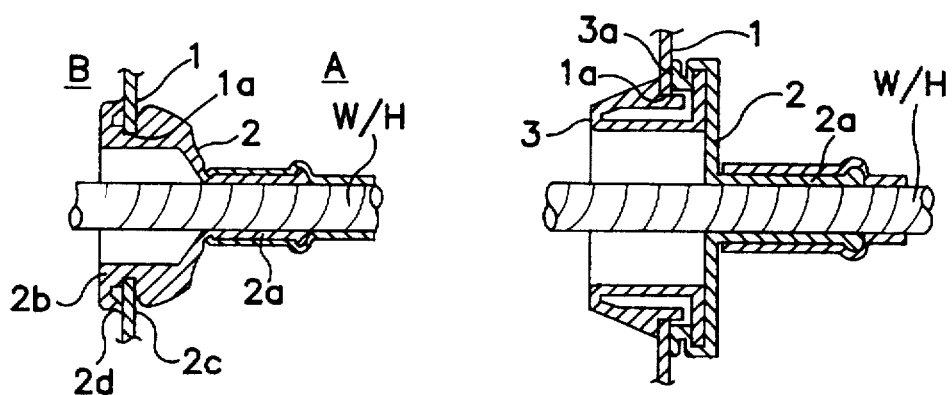
FIG. 6A
PRIOR ART
FIG. 6B
PRIOR ART

_US005774934_

GROMMET AND A METHOD FOR MOUNTING A GROMMET

BACKGROUND OF THE INVENTION

1. Field of the Invention

The present invention relates to a grommet mountable into a hole formed in a body panel of a vehicle with a wiring harness inserted therethrough and is particularly designed to improve the mounting operability of a grommet. Furthermore the present invention relates to a method for mounting a grommet into a body panel, in particular of a vehicle.

2. Description of the Prior Art

A prior art automotive wiring harness W/H is inserted through a through hole 1a formed in a body panel of a vehicle (e.g. a dashboard partitioning an engine compartment A and a passenger compartment B) as shown in FIG. 6A. More particularly, the wiring harness W/H is inserted through a small diameter tubular portion 2a of a prior art grommet 2 made of rubber. The wiring harness W/H and the small end 2a of the grommet 2 then are inserted through the hole 1a from the engine compartment A side to the passenger compartment B side. After sufficient insertion, a groove 2c formed in the outer surface of a large diameter portion 2b is fitted to the edge of the through hole 1a. In this way, the grommet 2 is mounted in the through hole 1a of the body panel 1.

However, while the large diameter portion 2b of the grommet 2 is inserted into the through hole 1a, a lip portion 2d formed at its lending end may be deformed by the edge of the through hole 1a, thereby entering the groove 2c to close it. In such a case, the grommet 2 cannot be securely mounted and a water leak may be caused by poor sealability. In view of this, the grommet 2 is pulled back after being inserted into the through hole 1a to the rear end of the large diameter portion 2b so as to prevent the above deformation of the lip portion 2d. However, this requires a push-in operation and a pull-back operation which are performed in two directions, resulting in poor mounting operability.

There is also known a grommet which is secured to a large diameter member 3 made of synthetic resin as a substitute of the large diameter portion 2b of the grommet 2, wherein a groove formed in the outer surface thereof is engaged with the edge of the through hole 1a (see Japanese Unexamined Patent Publication No. 2-66816). However, this arrangement requires a two-piece construction including the grommet 2 and the large diameter member 3, presenting a problem of an increased production cost.

The present invention was developed to solve the above problems and an object thereof is to provide a grommet and a method for mounting a grommet, which allow the grommet to be easily and inexpensively mountable on a body panel preferably of a vehicle, in particular by being inserted in one direction.

SUMMARY OF THE INVENTION

According to the invention, there is provided a grommet, comprising: a small diameter tubular portion, a large diameter tubular portion, a locking groove being fittable to a body panel, in particular of a vehicle, and a turnup portion, in particular being folded or foldable back from an outer radial end of the large diameter tubular portion toward the small diameter tubular portion. The locking groove is formed in an outer surface of the turnup portion, and preferably is located radially outside of the large diameter tubular portion. The locking groove has a variable cross section depending on whether the turnup portion is in a first position or a second position. The locking groove, in its inserting position, is arranged at the front end of the grommet, and preferably is biased toward its fitting position, when the turnup portion is in its first position, thereby allowing the grommet to be inserted into the body panel. The locking groove is restored to its fitting position, when the turnup portion is in its second position, so as to be fittable to the body panel.

With this construction, the insertability of the grommet into the body panel, e.g. a panel of a vehicle, depends upon the positioning of the foldup portion. In other words the locking groove varies its configuration depending upon the configuration of a separate portion of the grommet. Thus the grommet is insertable (inserting position) into the body panel or is fittable (fitting position) onto the body panel. In particular, when the foldup portion is in its first position the locking groove is in its inserting position, while when the foldup portion is in its second position, the locking groove is in its fitting position. However it is not necessary that the foldup portion be folded or foldable back.

According to a preferred embodiment of the invention, the turnup portion is located in its first and second positions at different locations along the axial direction (or at different axial positions), in particular with respect to the small diameter portion.

Preferably, the locking groove comes to have a substantially L-shaped cross section, when the turnup portion is in its first position, and wherein the locking groove is restored to have a substantially U-shaped cross section, when the turnup portion is in its second position.

Further preferably, the grommet further comprises locking means for holding or locking the turnup portion in its first position or its second position. The locking means preferably comprises a locking portion projecting radially inwardly from the turnup portion and extending toward the small diameter tubular portion. A locking stepped portion may project from the outer surface of the large diameter tubular portion, in particular in a position substantially corresponding to the locking groove.

Still further preferably, when the locking portion is engaged with the locking stepped portion after pulling the small diameter tubular portion back to locate the locking stepped portion more backward than the locking portion, the turnup portion is in its first position. When the locking portion is disengaged from the locking stepped portion, in particular after the insertion, the turnup portion is in its second position.

Most preferably, the radially inwardly projecting end of the locking portion is located more radially inward than the radially outwardly projecting end of the locking stepped portion in a normal state of the grommet, in particular where no force is exerted thereon. When the small diameter tubular portion is pulled back to make the large diameter tubular portion radially smaller, the radially outwardly projecting end of the locking stepped portion may be located more radially inward than the radially inwardly projecting end of the locking portion. When a pulling force acting on the small diameter tubular portion is released, the locking stepped portion may be returned to its first position.

According to a further preferred embodiment, a portion of the grommet extending from the large diameter tubular portion through the front end surface to a position of the turnup portion where the locking groove is formed is substantially thicker than the other parts of the grommet. Cuts may be circumferentially formed at intervals in the front surface so as to facilitate the deformation of the thick portion.

Preferably, deformation facilitating means are provided so as to facilitate the deforming and restoring action of the grommet, when the turnup portion is shifted between its first and second positions.

Most preferably, the small diameter tubular portion, the large diameter tubular portion, the locking groove and the turnup portion are integrally or unitarily formed.

According to the invention, there is further provided a method for mounting or fitting a grommet, in particular according to the invention, into or to a body panel, in particular of a vehicle, comprising the steps of:

- displacing or shifting the turnup portion to a first position for varying the cross section of a locking groove formed in a turnup portion of the grommet toward an inserting or insertion position thereof (or opening the locking groove); inserting the grommet into the body panel;
- displacing the turnup portion to a second position for varying the cross section of the locking groove toward a fitting position thereof (or restoring or closing the locking groove), thereby fitting the locking groove to the body panel.

According to a preferred embodiment of the invention, the turnup portion displacing steps comprise the step of substantially axially shifting the turnup portion at least between the first position and the second position.

Preferably, the step of varying the cross section of the locking groove toward a fitting position thereof is supported by a biasing or restoring force biasing the locking groove toward its fitting position.

Further preferably, the turnup portion displacing step comprises the step of axially pushing or shifting or moving the grommet onto the body panel, in particular an edge of an opening thereof, to displace the turnup portion from the first position to the second position. Thus an easy mounting of the grommet on the body panel is possible, since the grommet is easily "locked" thereto by fitting the locking groove to the body panel.

According to still a further preferred embodiment of the invention, there is provided a grommet which is provided with a hollow wiring harness insertion portion extending along axes of small and large diameter tubular portions. The grommet is mountable by being inserted into a hole formed in a body panel of a vehicle in one direction after a wiring harness is inserted into the wiring harness insertion portion and by engaging a locking groove formed in the outer surface of the large diameter tubular portion with the edge of the hole of the body panel. The grommet has a turnup portion folded back from the outer radial end of the large diameter tubular portion toward the small diameter tubular portion. A locking portion projects radially inwardly from the leading end of the turnup portion extending toward the small diameter tubular portion. A locking stepped portion projects from the outer surface of the large diameter tubular portion in a position corresponding to the locking groove. The locking groove has a U-shaped cross section and is formed in the outer surface of the turnup portion located radially outside of the large diameter tubular portion. The locking portion is engaged with the locking stepped portion after pulling the small diameter tubular portion back to locate the locking stepped portion more backward than the locking portion. The locking groove then comes to have an L-shaped cross section and is located at the front end of the grommet. This allows the grommet to be inserted into the hole in the body panel. The locking portion is disengaged from the locking stepped portion after the insertion. The locking groove then is restored to have a U-shaped cross section so as to be fittable to the hole in the body panel.

Accordingly, when the small diameter tubular portion is pulled back, while the outer surface of the locking portion is held by a jig or an operator so as not to be pulled, the turnup portion of the large diameter tubular portion is pulled back while the locking groove formed therein is opened to have an L-shaped cross section. As a result, the large diameter tubular portion is radially contracted. When the locking stepped portion is located more backward than the locking portion, the locking portion is engaged with the locking stepped portion, thereby temporarily preventing the large diameter tubular portion from restoring to have a larger diameter. If the locking portion is disengaged from the locking stepped portion after the locking groove is smoothly fitted to the hole in the body panel in this state, the locking groove is restored to have a U-shaped cross section as the turnup portion is restored to its front position, thereby allowing the radial expansion of the large diameter tubular portion. As a result, the locking groove is automatically secured to the edge of the hole in the body panel. Therefore, the grommet can easily be mounted in the hole in the body panel only in one operation by being inserted from an insertion side in one direction.

As is clear from the above description, the locking groove is opened to have an L-shaped cross section by pulling back the small diameter tubular portion, thereby making the large diameter tubular portion radially smaller. The radially expansive restoration of the large diameter tubular portion is temporarily hindered by the engagement of the locking portion and the locking stepped portion, holding the grommet in this locked position. Accordingly, the locking groove of the large diameter tubular portion can be smoothly inserted into the hole in the body panel. On the other hand, when the locking portion is disengaged from the locking stepped portion after the insertion, the locking groove is restored to have a U-shaped cross section, and the large diameter tubular portion is restored to have a larger diameter again. Therefore, the locking groove can automatically be fitted to the edge of the hole in the body panel.

Accordingly, the grommet can be easily mounted in the hole in the body panel only by being inserted from the insertion side with a small force, improving mounting operability. Further, since the grommet has a one-piece construction unlike the prior art grommet having a two-part construction, it can be produced at a reduced cost.

Preferably, the radially inwardly projecting end of the locking portion is located more radially inward than the radially outwardly projecting end of the locking stepped portion in a normal state of the grommet where no force is exerted thereon. When the small diameter tubular portion is pulled back to make the large diameter tubular portion radially smaller, the radially outwardly projecting end of the locking stepped portion is located more radially inward than the radially inwardly projecting end of the locking portion. When a pulling force acting on the small diameter tubular portion is released, the locking stepped portion is returned to its front position.

With this arrangement, the locking portion can automatically be engaged with the locking stepped portion only by pulling back the small diameter tubular portion until the locking stepped portion moves beyond the locking portion.

Further, by locating the radially outward end of the locking stepped portion more radially outward than the inwardly projecting end of the locking portion, the locking portion can automatically be engaged with the locking stepped portion only by pulling back the small diameter tubular portion until the locking stepped portion moves beyond the locking portion.

Preferably, a portion of the grommet extending from the large diameter tubular portion through the front end surface to a position of the turnup portion where the locking groove is formed is thicker than the other parts of the grommet, and cuts are circumferentially formed at intervals in the front surface so as to facilitate the deformation of the thick portion.

With this arrangement, when the small diameter tubular portion is pulled back, the thick portion of the large diameter tubular portion is easily deformed by the narrowing of the cuts. Accordingly, a smaller force is required to pull the small diameter tubular portion, lightening a burden on the operator.

Furthermore, since the cuts are circumferentially formed at intervals in the front end surface of the thick large diameter tubular portion and the circular cut is formed along the circumferential direction, when the small diameter tubular portion is pulled back, the thick portion of the large diameter tubular portion is easily deformable by the narrowing of the cuts. This advantageously enables the operator to pull the small diameter tubular portion with a small force.

BRIEF DESCRIPTION OF THE DRAWINGS

These and other objects, features and advantages of the present invention will become more apparent upon a reading of the following detailed description and accompanying drawings in which:

FIGS. 1(A) and 1(B) are a side view in section and a front view of a grommet according to the invention.

FIG. 2 is a perspective view of the grommet.

FIG. 5 is a side view in section of a grommet according to one modification.

FIGS. 6(A) and 6(B) are side views in section of prior art grommets.

DETAILED DESCRIPTION OF THE PREFERRED EMBODIMENT

Figure 3:
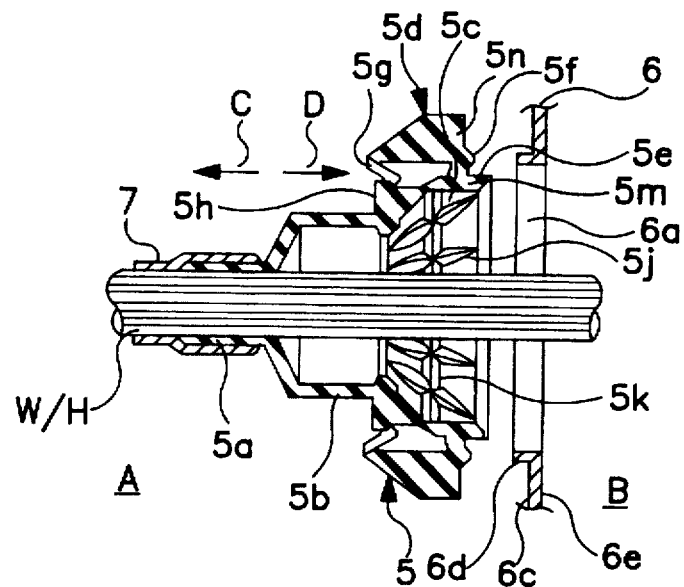
FIG. 3 is a side view in section of the grommet with a radially contracted large diameter tubular portion.

As shown in FIG. 3, a through hole 6a is formed in a body panel 6 partitioning an engine compartment A and a passenger compartment B of an automotive vehicle. A tubular bar ring 6d projects at the edge of the through hole 6a on a surface 6c at the side of the engine compartment A (insertion side).

On the other hand, a grommet 5 made of rubber or elastomer according to this embodiment includes, from its rear end, a small diameter tubular portion 5a, a medium diameter tubular portion 5b continuous with the front end of the small diameter tubular portion 5a, a large diameter tubular portion 5c continuous with the front end of the medium diameter tubular portion 5b, and a turnup portion 5d substantially folded or foldable back from the radial outer end of the large diameter tubular portion 5c toward the small diameter tubular portion 5a.

A hollow portion extending along axes of the respective tubular portions 5a to 5c acts as a wiring harness insertion portion. After a wiring harness W/H is inserted into this insertion portion, a tape or the like sealing means 7 is wound around the outer surface of the small diameter tubular portion 5a as well as the outer surface of the wiring harness W/H, thereby fixing the grommet 5 to the wiring harness W/H.

A locking groove 5e having preferably a substantially U-shaped cross section which is to be fitted to the edge of the through hole 6a of the body panel 6 is formed in the outer surface of the turnup portion 5d of the large diameter tubular portion 5c of the grommet 5, dividing the turnup portion 5d into a front portion 5m and a rear portion 5n. A projection 5f is provided on the bottom surface of the locking groove 5e to improve sealability by elastically coming into contact with the edge of the through hole 6a. Further, the opposite side walls of the locking groove 5e are slightly inclined inward to improve sealability by elastically coming into contact with opposite surfaces 6c, 6e of the body panel 6.

Figure 4:
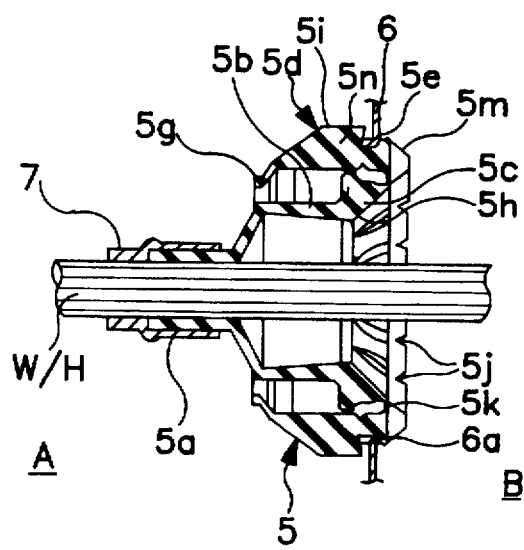
FIG. 4 is a side view in section of the grommet mounted in a through hole of a body panel.

A notch 5i is formed in the inner surface of the turnup portion 5d located more backward than the locking groove 5e. Because of the presence of the notch 5i, as shown in FIG. 4, the front portion 5m of the turnup portion 5d can be pulled open so that the rear portion 5n and the bottom surface of the locking groove 5e form a substantially L-shaped cross section.

At the leading end of the turnup portion 5d extending backward toward the small diameter tubular portion 5a, there is provided a locking portion 5g projecting radially inward.

On the other hand, on the outer surface of the large diameter tubular portion 5c, a locking stepped portion 5h whose outer end is located more radially outward than the inner end of the locking portion 5g is provided in a position substantially corresponding to the locking groove 5e.

The large diameter tubular portion 5c is thick through the front end surface to the position of the turnup portion 5d where the locking groove 5e is formed. In the front end surface of this thick portion, V or spearhead-shaped cuts 5j are circumferentially formed, in particular radially arranged, at preferably equal intervals (e.g. 22.5°) and a circumferentially continuous cut 5k having a V-shaped cross section is so formed as to intersect substantially with the middle parts of the cuts 5j.

When the small diameter tubular portion 5a is pulled back in a direction of arrow C in a state of FIG. 2 while the outer surface of the locking portion 5g is held by a jig or an operator's hand, this pulling force is applied to the large diameter tubular portion 5c, with the result that the large diameter tubular portion 5c is so deformed as to narrow the width of the cuts 5j. As a larger pulling force is applied, the large diameter tubular portion 5c progressively undergoes a radial contraction and moves backward in the direction C (to the left in FIG. 2).

When a further larger pulling force is applied, the width of the cuts 5j and 5k becomes even narrower, with the result that an upper side in FIG. 2 rotates clockwise with the bottom of the locking groove 5e as a center of rotation while the front portion 5m undergoes a radially contractive deformation. This rotation is made possible because the bottom of the locking groove 5e is bent during this time. The locking groove 5e is brought to its open state as shown in FIG. 3 by the radially contractive deformation and the rotation of the front portion 5m.

When the turnup portion 5d is pulled back, the thick portion of the large diameter tubular portion 5c is easily deformable because of the presence of the cuts 5j and 5k. Accordingly, the small diameter tubular portion 5a can be pulled with a small force.

If the pulling of the small diameter tubular portion 5a is stopped after the locking stepped portion 5h of the large diameter tubular portion 5c is brought to a position more backward than the locking portion 5g of the turnup portion 5d by further pulling the small diameter tubular portion 5a, the large diameter tubular portion 5c tries to restore forward due to the restoring force of the turnup portion 5d. However, since the locking portion 5g is automatically engaged with the locking stepped portion 5h as shown in FIG. 3, the radially expansive restoration of the large diameter tubular portion 5c is temporarily hindered, i.e. temporarily held in this position.

By the engagement of the locking portion 5g and the locking stepped portion 5h, the locking groove 5e is held open and the outer diameter of the front portion 5m is held smaller than the diameter of the through hole 6a as shown in FIG. 3. In this state, the front portion 5m can be smoothly inserted into the through hole 6a of the body panel 6 from the engine compartment A side.

Thereafter, when the locking portion 5g is disengaged from the locking stepped portion 5h by a jig or an operator's hand, the front portion 5m restores its shape to have an original diameter while rotating as the pulling force decreases. Then, the locking groove 5e restores its shape to have a U-shaped cross section and the large diameter tubular portion 5c radially expands again as shown in FIG. 4, with the result that the locking groove 5e is automatically fitted to the edge of the through hole 6a of the body panel 6.

As described above, the grommet 5 can be easily mounted into the through hole 6a of the body panel 6 by being inserted with a small force in one direction from the engine compartment A side after the locking portion 5g is engaged with the locking stepped portion 5h to temporarily prevent the radially expansive restoration of the large diameter tubular portion 5c.

Although the medium diameter tubular portion 5b is provided between the small and large diameter tubular portions 5a and 5c of the grommet 5 in this embodiment, it may be omitted and the large diameter tubular portion 5b may be formed such that the diameter thereof gradually increases from the small diameter tubular portion 5a as shown in FIG. 5.

What is claimed is:

1. A grommet (5) for mounting to a body panel (6), said grommet (5) having opposed front and rear ends and comprising:

a tubular portion (5c) extending rearwardly from said front end;

a turnup portion (5d) projecting outwardly and axially from the front end, the turnup portion (5d) being formed with a locking groove (5e) located radially outside of the tubular portion (5c), the turnup portion (5d) being deformable between a first position where said locking groove (5e) opens forwardly to define an inserting position allowing the grommet (5) to be inserted into the body panel (6), and a second position where the locking groove (5e) opens radially outwardly to define a fitting position where the body panel (6) is engageable in the locking groove (5e) of the turnup portion (5d).

2. A grommet according to claim 1, wherein the first and second positions of the turnup portion (5d) are spaced axially.

3. A grommet according to claim 1, wherein the locking groove (5e) defines a substantially L-shaped cross section when the turnup portion (5d) is in its first position, and wherein the locking groove (5e) defines a substantially U-shaped cross section when the turnup portion (5d) is in its second position.

4. A grommet according to claim 1, further comprising locking means (5g, 5h) for holding the turnup portion (5d) in one of said first and second positions, the locking means (5g, 5h) comprising:

a locking portion (5g) projecting radially inwardly from the turnup portion (5d) and extending toward the rear end, and a locking stepped portion (5h) projecting from the outer surface of the tubular portion (5c) and in a position substantially radially aligned with the locking groove (5e), the locking portion (5g) being engageable with the locking stepped portion (5h).

5. A grommet according to claim 4, wherein the locking portion (5g) is engaged with the locking stepped portion (5h) when the turnup portion (5d) is in its first position; and wherein the locking portion (5g) is disengaged from the locking stepped portion (5h), when the turnup portion (5d) is in its second position.

6. A grommet according to claim 5, wherein the locking portion (5g) has a radially inwardly projecting end located more radially inwardly than a radially outwardly projecting end of the locking stepped portion (5h) in an unbiased state of the grommet (5), the rear end being deformable rearwardly to make the tubular portion (5c) at the front end radially smaller, thereby the radially outwardly projecting end of the locking stepped portion (5h) being located more radially inward than the radially inwardly projecting end of the locking portion (5g); and when a pulling force acting on the rear end is released, the locking stepped portion (5h) is returned to its first position.

7. A grommet according to claim 1, wherein sections of the turnup portion (5d) adjacent the locking groove (5e) are substantially thicker than the other parts of the grommet (5), and wherein cuts (5j; 5k) are circumferentially formed at intervals in the front end so as to facilitate the deformation of the thick portion.

8. A grommet according to claim 1, wherein deformation facilitating means (5j; 5k) are provided for facilitating the deforming and restoring action of the grommet (5), when the turnup portion (5d) is shifted between its first and second positions.

9. A grommet according to claim 1, wherein the grommet is unitarily formed.

10. A grommet for mounting in an aperture of a body panel, said grommet being unitarily formed from a resiliently deformable material and having opposed front and rear ends, said grommet comprising:

a tubular portion extending continuously between the front and rear ends of the grommet;

a turnup portion projecting outwardly and axially from said tubular portion at said front end of said grommet, said turnup portion having an outer surface formed with an inwardly extending annular locking groove dividing said turnup portion into a front portion nearer said front end of said grommet and a rear portion nearer said rear end of said grommet, said turnup portion being resiliently deformable between a first position where said front portion is deformed forwardly and inwardly such that said locking groove defines a forwardly opening L-shaped cross section dimensioned for slidable insertion into said aperture in said body panel, said front portion of said turnup portion being resiliently returnable from said first position to a second position where said locking groove opens radially outwardly for engaging said body panel between said front and rear portions of said turnup portion.

11. The grommet of claim 10, further comprising locking means for releasably locking said turnup portion in said first position.

12. A method for mounting a grommet (5), into a body panel (6) comprising the steps of:

providing a grommet having a tubular portion with opposed front and rear ends, a turnup portion projecting outwardly and axially from the front end of the tubular portion, a locking groove (5e) formed in said turnup portion (5d);

displacing the turnup portion (5d) to a first position such that the locking groove (5e) formed in the turnup portion (5d) of the grommet (5) opens forwardly to define an inserting position thereof, inserting the front end into the body panel (6), displacing the turnup portion (5d) to a second position such that the locking groove (5e) opens outwardly and fits to the body panel (6).

* * * * *